United States Patent [19]

Sumimoto et al.

[11] Patent Number: 4,815,556
[45] Date of Patent: Mar. 28, 1989

[54] VIBRATION-PROOF APPARATUS FOR A VEHICLE

[75] Inventors: Takashi Sumimoto; Takashi Hirochika; Hideki Imanishi; Kazuo Kubo, all of Aki, Japan

[73] Assignee: Mazda Motor Corporation, Hiroshima, Japan

[21] Appl. No.: 94,591

[22] Filed: Sep. 9, 1987

[30] Foreign Application Priority Data

Sep. 10, 1986 [JP] Japan ................................ 61-213068

[51] Int. Cl.⁴ ............................................ B60F 25/00
[52] U.S. Cl. ..................................... 180/311; 180/902; 267/292
[58] Field of Search ....................... 180/311, 310, 902; 267/2, 292; 280/716

[56] References Cited

U.S. PATENT DOCUMENTS 3,395,769 8/1968 Julien .................................. 180/902
4,726,573 2/1988 Hamaekers ......................... 180/902

FOREIGN PATENT DOCUMENTS 56-43027 4/1981 Japan .

Primary Examiner—Richard A. Bertsch
Attorney, Agent, or Firm—Wenderoth, Lind & Ponack

[57] ABSTRACT

For reducing vibrations having different frequencies and transmitted to a chassis of a vehicle, a vibration-proof apparatus mounted on a support member supporting a vibratory body on the chassis includes a first dynamic damper and a second dynamic damper secured to the support member, such dynamic dampers being arranged to absorb vibrations having different frequencies. The apparatus is particularly applicable to a subframe which undergoes vibrations from a differential device and from a propeller shaft.

22 Claims, 5 Drawing Sheets

VIBRATION-PROOF APPARATUS FOR A VEHICLE

BACKGROUND OF THE INVENTION

1. Field of the Invention

The present invention relates to a vibration-proof apparatus for use in a vehicle to reduce transmission of vibration from a vibratory body to a chassis on which the vibratory body is supported.

2. Description of the Prior Art

In general, a vibratory body mounted on a vehicle, such as a differential device or the like, is supported on the chassis through a support member, so that vibration of the vibratory body is transmitted to the chassis via the support member with a specific frequency as a peak value. The thus transmitted vibration having a specific frequency generates another vibration, noisy sound or the like in a cabin of the vehicle, thus resulting in a person occupying the cabin having an unpleasant feeling.

Various kinds of techniques heretofore have been known as measures for preventing the occurrence of such aforesaid vibration. For instance, Japanese Patent Laid-Open document No. 43027/81 discloses a device to reduce vibration generated in a transmission for converting rotation of an engine into driving torque. In that device, a support member for supporting an extension housing of the transmission on a chassis is provided with a tuning mass as a vibratory member adapted to resonate with a vibration having a specific frequency which conducts through the support member. Thus, vibration energy conducted to the support member is intended to be absorbed and damped by consuming it through resonance of the tuning mass so that vibration to be transmitted to the chassis can be reduced.

However, the above device can only deal with vibration having one kind of peak frequency because the tuning mass acting as a vibratory member is fitted directly to the support member. Accordingly, in the case where vibrations having different peak frequencies are transmitted through a single support member, the device can only reduce either one of such vibrations. For instance, in a rear wheel driven vehicle, a differential device as a vibratory body to which the rear end of a propeller or drive shaft is connected is supported on a subframe at the rear part of a chassis of the vehicle. This leads to a result that vibrations having different peak frequencies, comprising vibration from the differential device and vibration caused by imbalance during rotation of the propeller shaft, are transmitted to the chassis. It is difficult for the aforesaid device to effectively deal with reduction of such vibrations.

It is therefore an object of the present invention to provide a vibration-proof apparatus which assures that vibrations having different peak frequencies on a single support member are effectively damped and thereby unpleasant vibration or the like transmitted into a cabin are reduced satisfactorily.

SUMMARY OF THE INVENTION

A vibration-proof apparatus for a vehicle according to the present invention is adapted to be mounted on a support member which supports a vibratory body on a chassis, for reducing vibration transmitted from the vibratory body to the chassis. The apparatus includes a first dynamic damper and a second dynamic damper secured to the support member, the first and second dynamic dampers being adapted to absorb vibrations having different frequencies.

When the support member undergoes vibrations having two different frequencies as peak values, the first dynamic damper may resonate at one of those frequencies while the second dynamic damper may resonate at the other of those frequencies, thereby reducing vibrations effectively. A cabin of the vehicle can therefore be maintained comfortable at remarkably reduced levels of vibration and noise.

The present apparatus may be particularly applicable to a subframe in the rear portion of the chassis. In that case, the support member comprises the subframe which supports a differential device and a suspension link for suspending wheels. One of the first and second dynamic dampers may be adapted to absorb vibration caused by the differential device, while the other of these dynamic dampers may be adapted to absorb vibration caused by imbalance during rotation of a propeller shaft connected to the differential device.

Preferably, the apparatus further comprises a bracket attached to the support member, and the first and second dynamic dampers are attached to the bracket prior to attachment thereof to the support member.

Other objects, features and advantages of the present invention will become readily apparent from the following description taken in conjunction with the accompanying drawings.

DESCRIPTION OF THE PREFERRED EMBODIMENTS

Figure 4:
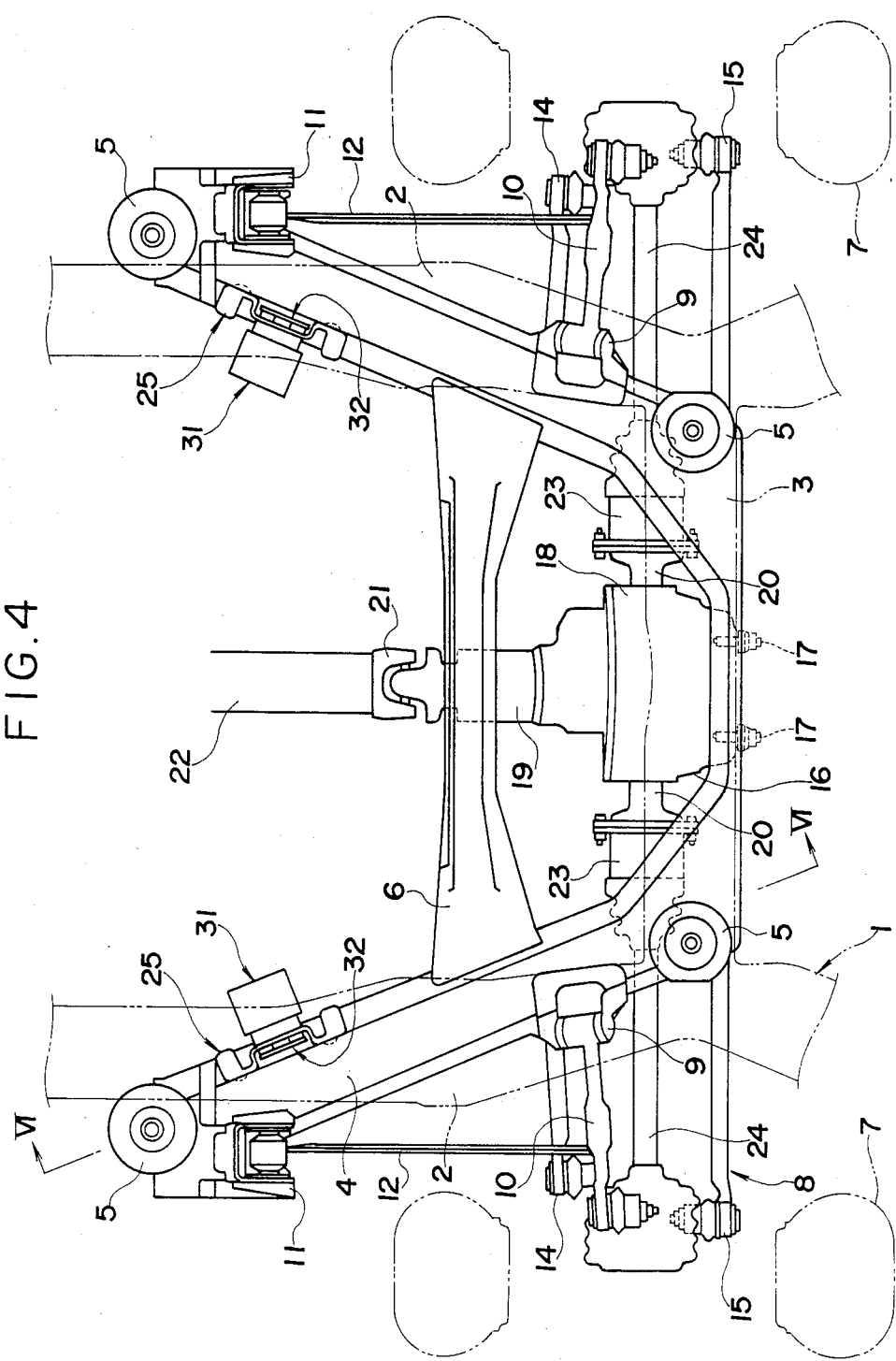
FIG. 4 is a plan view illustrating a subframe carrying a differential device and a suspension system.
Figure 5:
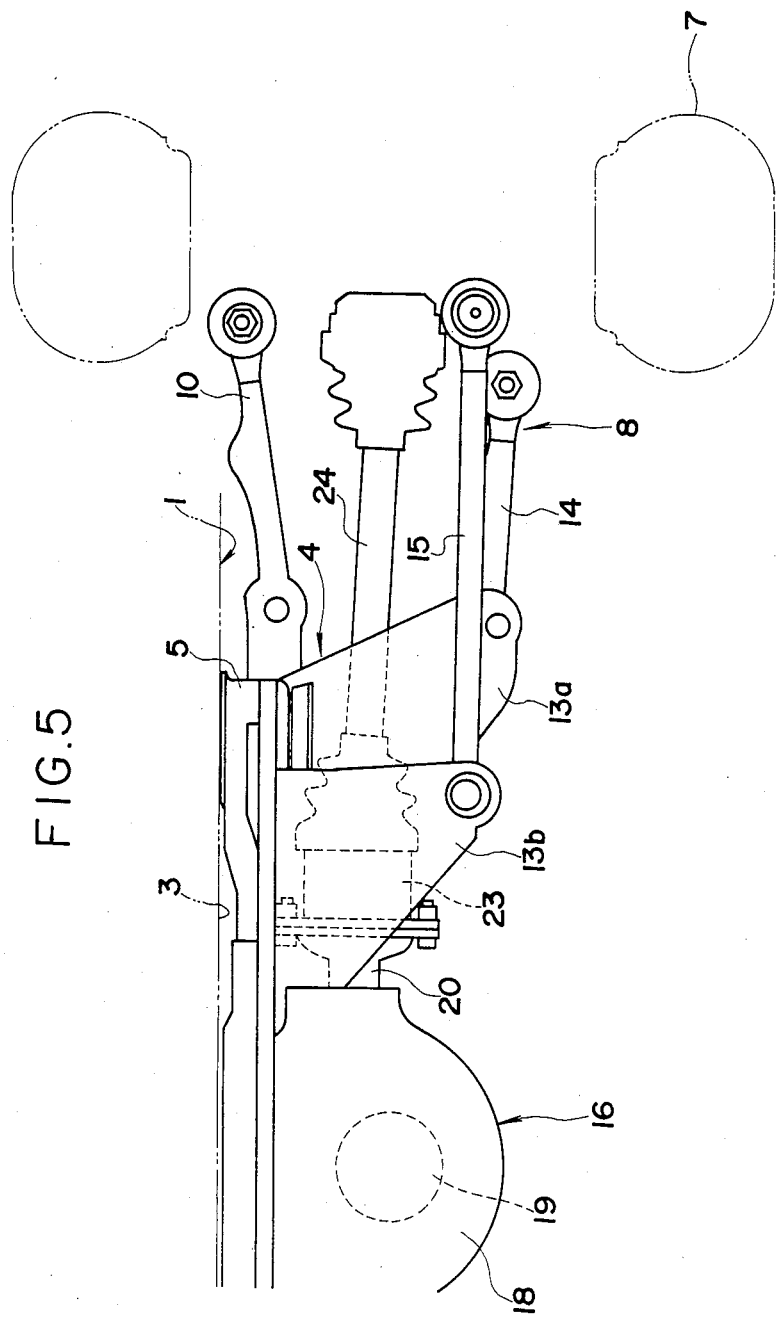
FIG. 5 is a fragmentary front view thereof.
Figure 6:
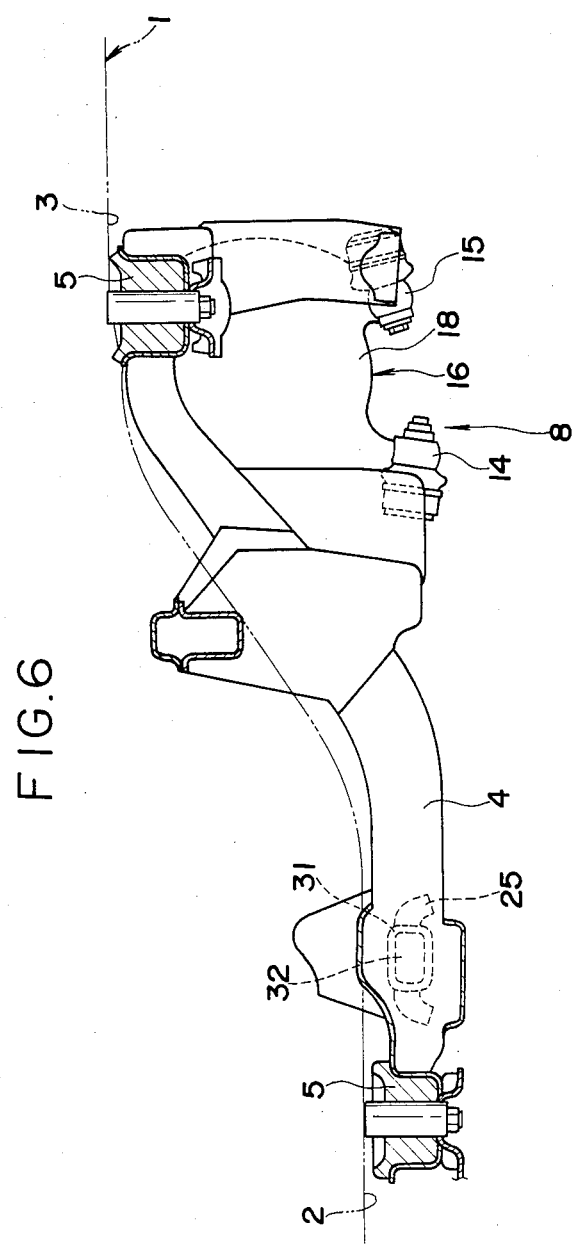
FIG. 6 is a sectional view taken along line VI—VI in FIG. 4.

Referring first to FIGS. 4 to 6 of the drawings, a chassis of a vehicle is designated by numeral 1, while reference numeral 2 indicates side members constituting the side portions of the chassis 1, a cross-member 3 extending between the side members 2 in the transverse direction of the vehicle. A substantially U-shaped subframe 4 serving as a support member is mounted on the chassis 1 at the rear part thereof with the aid of mount rubbers 5 and includes a reinforcement plate 6 which extends in the transverse direction.

Left-hand and right-hand rear suspensions 8 for suspending rear wheels 7 are mounted to the subframe 4 at the respective corners thereof. Specifically, each of the suspensions 8 includes an upper lateral link 10 an outer end of which is swingably supported at the force side of the mount rubber 5 located in the rear corner portion of the subframe 4 with the aid of a bracket 9 and an outer end of which is swingably connected to an axle hub. The force end of a trailing arm 12 is swingably supported at the rear side of the mount rubber 5 located in the force end portion of the subframe 4 through a bracket 11, while the rear end of the trailing arm 12 is swingably connected to the axle hub. Also, the inner end of a fore lateral link 14 is swingably supported on a substantially triangular support plate 13a secured to the rear portion of the subframe 4, and the outer end of the fore lateral link 14 is swingably connected to the axle hub. The suspension 8 further includes a rear lateral link 15 an inner end of which is swingably supported on a support plate 13b secured to the middle portion of the subframe 4 and an outer end of which is swingably connected to the axle hub.

A differential device 16 constituting a vibratory body is fixedly secured to the rear center portion of the subframe 4 by means of bolts 17. The differential device 16 includes an input shaft 19 projected forwardly of a casing 18 and left-hand and right-hand output shafts 20 projected laterally of the casing 18. The input shaft 19 is operatively connected to an engine (not shown) via a joint 21, a propeller or drive shaft 22 extending in the longitudinal direction of the vehicle and a transmission (not shown). On the other hand, each of the output shafts 20 is connected via a joint 23 to the inner end of an axle shaft 24 extending to the rear wheel 7. By the above arrangements driving torque of the engine is transmitted to the rear wheels 7.

Figure 1:
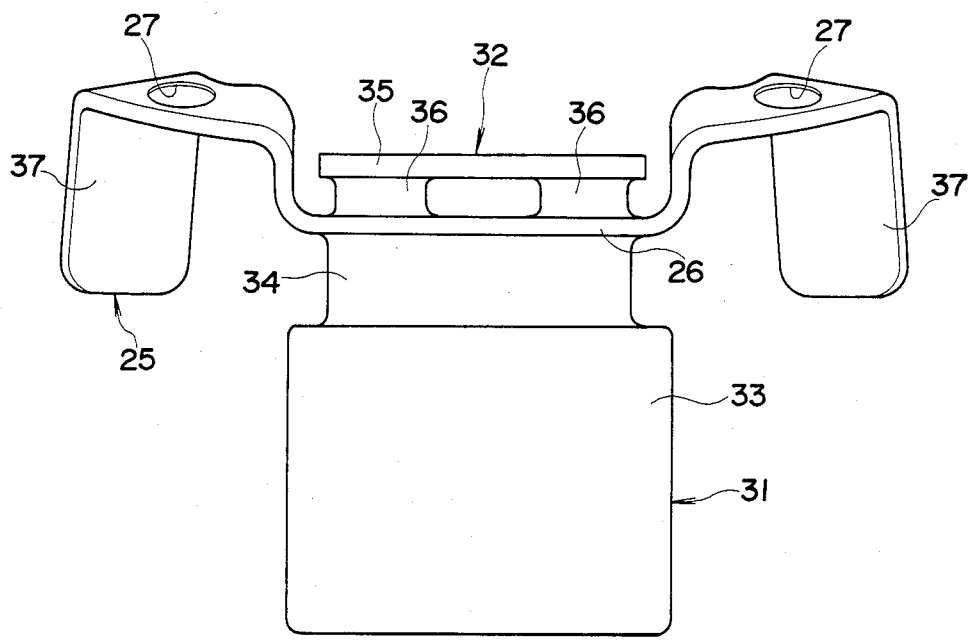
FIG. 1 is a plan view illustrating a bracket and dynamic dampers of an apparatus according to an embodiment of the invention.
Figure 2:
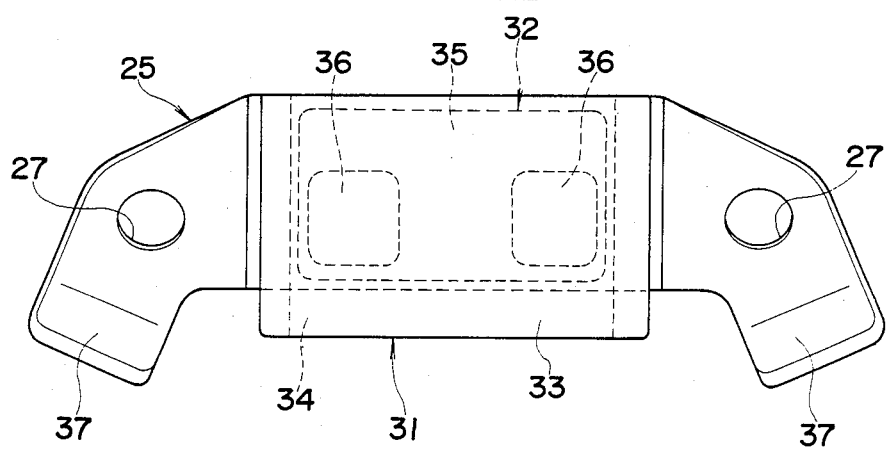
FIG. 2 is a front view thereof.
Figure 3:
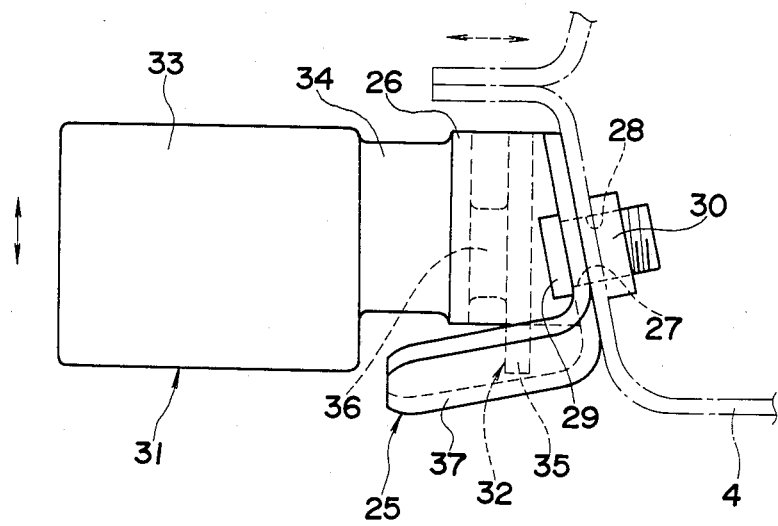
FIG. 3 is a side view thereof.

Further, the subframe 4 has two brackets 25 secured to the inner surface thereof at positions between its fore ends and the reinforcement plate 6. As shown in an enlarged scale in FIGS. 1 to 3, each bracket 25 has a recess 26 projected toward the inside of the chassis and is formed with openings 27 at both ends. The bracket 25 is fixed to the subframe 4 by aligning the openings 27 on the bracket 25 with bolt holes 28 on the subframe 4, inserting bolts 29 through the openings 27 and bolt holes 28 from the inner side of the chassis 1 and by threadedly engaging nuts 30 with the projected portions of the bolts 29 from the outer side, i.e. the right-hand side in FIG. 3, of the subframe 4.

Attached to the inner and outer surfaces (i.e. the lower and upper surfaces in FIG. 1) of each bracket at the recess 26 are a first dynamic damper 31 and a second dynamic damper 32, respectively, for reducing vibrations transmitted from the differential device 16 to the chassis 1. The first dynamic damper 31 disposed on the inner surface (lower surface in FIG. 1) of the bracket 25 comprises a weight member 33 having a predetermined weight (for instance, 900 g) to serve as a vibratory member and a rubber support 34 for elastically attaching the weight member 33 to the bracket 25 so that the member 33 may resonate with vibration in the vertical direction (in the direction as indicated by the solid arrow in FIG. 3) of the chassis 1. The weight member 33 has a hexahedral configuration and is adapted to resonate with vibration which is caused by imbalance during rotation of the propeller shaft 22 and has a frequency of, for example, 45 Hz as a peak value.

On the other hand, the second dynamic damper 32 attached to the outer surface (upper surface in FIG. 1) of the bracket 25 comprises a plate-shaped weight member 35 having a predetermined weight (for instance, 70 g) to serve as a vibratory member and a pair of small rubber supports 36 for elastically attaching the weight member 35 to the bracket 25 so that the member 35 may resonate with vibration in the lateral direction (in the direction as indicated by the dotted arrow in FIG. 3) of the chassis 1. The weight member 35 is adapted to resonate with vibration which is caused by the differential device 16 with a noise and having a frequency of, for instance, 450 Hz as a peak value.

The end portions 37 of the bracket 25 are folded substantially perpendicularly in order to prevent foreign materials, which might jump up from the road, ground or the like (i.e. from the lower side in FIG. 3) during operation of a vehicle, from colliding with the rubber supports 34 and 36 of the dynamic dampers 31 and 32.

The subframe 4 undergoes vibrations from the differential device 16 and from the propeller shaft 22, which vibrations are then transmitted to the chassis 1, though the mount rubbers 5 absorb a part of those vibrations. In the above embodiment, however, the two dynamic dampers 31 and 32 mounted on the subframe 4 can effectively reduce by resonance those vibrations having different frequencies as peak values. The dynamic dampers 31, 32 are advantageously located at the fore end portions of subframe 4 where an amplitude of vibration is large. Thus, the chassis 1 is subjected undergoes only to reduced vibrations so that a cabin may be maintained comfortable at remarkably reduced level of vibration and noise.

The folded end portions 37 of the bracket 25 shade the rubber supports 34 and 36 of the dynamic dampers 31 and 32 on the recess 26 in such a manner as to prevent the rubber supports from being damaged by foreign materials such as small stones from the ground, thereby maintaining durability of the dampers. Further, both of the dynamic dampers 31 and 32 are attached to one bracket 25 which is then secured to the subframe 4, thus facilitating assembly while enabling efficient attachment.

In the above embodiment, the first dynamic damper 31 is adapted to reduce vibration caused due to rotational imbalance of the propeller shaft 22. If desired, the first dynamic damper 31 may be arranged to reduce wind-up vibration caused by reaction forces against driving of the propeller shaft 22 or the output shafts 20.

As is apparent from the above description, the apparatus of the invention is so constructed that a support member for supporting a vibratory body on a chassis is provided with two dynamic dampers adapted to absorb and reduce two kinds of specific vibrations having different frequencies. Thus, in a case where vibrations having two peaks in frequency are transmitted to the single support member, those vibrations can be effectively damped on that support member. Particularly, the present invention may be suitably applicable to a subframe in the rear portion fo the chassis for reducing vibration from a differential device and vibration resulted from rotational imbalance of a propeller shaft connected to the differential device. A cabin of a vehicle can therefore be maintained comfortable with remarkably reduced vibration and noise.

Although the invention has been described with reference to the preferred embodiments thereof, many modifications and alterations may be made thereto within the spirit of the invention.

What is claimed is:

1. A vibration-proof apparatus for a vehicle adapted to be mounted on a support member to support a vibratory body on a chassis for reducing vibration transmitted from the vibratory body to the chassis, said vibration-proof apparatus comprising:

a first dynamic damper and a second dynamic damper secured to said support member, said first and second dynamic dampers being adapted to absorb vibrations having different respective frequencies.

said first dynamic damper comprising a first weight member and a first rubber support connecting said first weight member to said support member; and said second dynamic damper comprising a second weight member having a weight different from that of said first weight member and a second rubber support connecting said second weight member to said support member.

2. A vibration-proof apparatus as claimed in claim 1, further comprising a bracket attached to said support member, said first and second dynamic dampers being attached to said bracket.

3. A vibration-proof apparatus as claimed in claim 2, wherein a preassembly of said bracket and said first and second dynamic dampers is attached to said support member.

4. A vibration-proof apparatus as claimed in claim 2, wherein said first dynamic damper is attached to a surface of said bracket and said second dynamic damper is attached to a reverse surface of said bracket.

5. A vibration-proof apparatus for a vehicle adapted to be mounted on a support member to support a vibratory body on a chassis for reducing vibration transmitted from the vibratory body to the chassis, said vibration-proof apparatus comprising:
a bracket attached to said support member;
a first dynamic damper attached to a surface of said bracket and a second dynamic damper attached to a reverse surface of said bracket;
said first and second dynamic dampers being adapted to absorb vibrations having different respective frequencies;
said first dynamic damper comprising a first weight member and a first rubber support connecting said first weight member to said surface of said bracket; and
said second dynamic damper comprising a second weight member and a second rubber support connecting said second weight member to said reverse surface of said bracket.

6. A vibration-proof apparatus as claimed in claim 5, wherein said first weight member has a weight different from that of said second weight member.

7. A vibration-proof apparatus for a vehicle adapted to be mounted on a support member supporting a vibratory body on a chassis for reducing vibration transmitted from said vibratory body to the chassis, said vibration-proof apparatus comprising:
a first dynamic damper and a second dynamic damper secured to said support member, said first and second dynamic dampers being adapted to absorb vibrations having different respective frequencies; and
said vibratory body comprising a differential device for transmitting rotation of a drive shaft to wheels.

8. A vibration-proof apparatus as claimed in claim 7, wherein one of said first and second dynamic dampers is adapted to absorb vibration caused by said differential device.

9. A vibration-proof apparatus as claimed in claim 8, wherein said one of said first and second dynamic dampers includes a vibratory member adapted to resonate with vibration having a frequency of 450 Hz as a peak value.

10. A vibration-proof apparatus as claimed in claim 8, wherein the other of said first and second dynamic dampers is adapted to absorb vibrations caused by imbalance during rotation of the drive shaft.

11. A vibration-proof apparatus as claimed in claim 10, wherein said other of said first and second dynamic dampers includes a vibratory member adapted to resonate with vibration having a frequency of 45 Hz as a peak value.

12. A vibration-proof apparatus as claimed in claim 8, wherein the other of said first and second dynamic dampers is adapted to absorb wind-up vibration caused by reactive force against driving rotation of the drive shaft or output shafts connecting said differential device of the wheels.

13. A vibration-proof apparatus as claimed in claim 7, wherein said support member comprises a subframe supporting said differential device and a suspension link for suspending the wheels.

14. A vibration-proof apparatus as claimed in claim 13, further comprising a bracket attached to said subframe, said first and second dynamic dampers being attached to said bracket.

15. A vibration-proof apparatus as claimed in claim 14, wherein said first dynamic damper comprises a first weight member and a first rubber support connecting said first weight member to a surface of said bracket, and said second dynamic damper comprises a second weight member and a second rubber support connecting said second weight member to a reverse surface of said bracket.

16. A vibration-proof apparatus as claimed in claim 15, wherein said first weight member has a weight different from that of said second weight member.

17. A vibration-proof apparatus as claimed in claim 16, wherein said bracket includes end portions folded substantially perpendicularly for protecting said rubber supports from foreign materials from the ground.

18. A vibration-proof apparatus as claimed in claim 13, wherein said subframe is supported on the chassis through a plurality of mount rubbers.

19. A vibration-proof apparatus as claimed in claim 18, wherein said subframe has a substantially U-shaped configuration with two opposite end portions thereof extending forwardly.

20. A vibration-proof apparatus as claimed in claim 19, wherein each of said dynamic dampers is disposed in the vicinity of a respective fore end of said subframe.

21. A vibration-proof apparatus as claimed in claim 20, wherein said subframe has secured thereto a reinforcement plate extending transversely in said subframe, and wherein each of said dynamic dampers is positioned between the respective said fore end and a portion at which said reinforcement plate is attached to said subframe.

22. A vibration-proof apparatus as claimed in claim 20, wherein said first and second dynamic dampers are provided in the vicinity of each said fore end of said subframe.

* * * * *